US009655138B2

United States Patent
Mildh et al.

(10) Patent No.: US 9,655,138 B2
(45) Date of Patent: May 16, 2017

(54) SYSTEM AND METHOD FOR SCHEDULING WIRELESS TRANSMISSIONS

(75) Inventors: Gunnar Mildh, Sollentuna (SE); Bogdan Timus, Spånga (SE); Jessica Östergaard, Stockholm (SE); Peter Moberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1419 days.

(21) Appl. No.: 13/076,698

(22) Filed: Mar. 31, 2011

(65) Prior Publication Data
US 2011/0243060 A1 Oct. 6, 2011

Related U.S. Application Data (60) Provisional application No. 61/320,039, filed on Apr. 1, 2010.

(51) Int. Cl.
*H04W 72/12* (2009.01)
*H04B 7/155* (2006.01)
*H04B 7/26* (2006.01)
*H04W 84/04* (2009.01)
*H04W 72/04* (2009.01)

(52) U.S. Cl.
CPC .... *H04W 72/1289* (2013.01); *H04B 7/15542* (2013.01); *H04B 7/2606* (2013.01); *H04W 72/0453* (2013.01); *H04W 84/047* (2013.01)

(58) Field of Classification Search
USPC ......... 370/229, 235, 236, 236.1, 236.2, 315, 370/345, 348
See application file for complete search history.

(56) References Cited

U.S. PATENT DOCUMENTS

| | | | | |
|---|---|---|---|---|
| 2009/0201846 | A1* | 8/2009 | Horn et al. | 370/315 |
| 2010/0130170 | A1* | 5/2010 | Liu et al. | 455/411 |
| 2010/0316096 | A1* | 12/2010 | Adjakple et al. | 375/211 |
| 2011/0244787 | A1* | 10/2011 | Kim et al. | 455/7 |
| 2012/0002597 | A1* | 1/2012 | Yang et al. | 370/315 |
| 2012/0113884 | A1* | 5/2012 | Park et al. | 370/312 |

(Continued)

FOREIGN PATENT DOCUMENTS

EP 2 306 661 A2 4/2011
WO WO 2009/095814 A1 8/2009

(Continued)

OTHER PUBLICATIONS

3GPP. Relays for LTE. Work item description. RP-091434.

(Continued)

*Primary Examiner* — Robert M Morlan (57) ABSTRACT

In accordance with one embodiment of the present disclosure, a method of operating a relay node includes receiving information, at the relay node, information identifying a plurality of subframes. The subframes represent time periods during which a base station may grant the relay node permission to transmit to the base station on a first frequency. The method also involves selecting one of the identified subframes to be used for a transmission between the relay node and a wireless terminal on the first frequency and transmits to the wireless terminal a scheduling grant granting the wireless terminal permission to transmit information on the first frequency during the selected subframe.

42 Claims, 5 Drawing Sheets

(56) References Cited

U.S. PATENT DOCUMENTS

2012/0140690 A1*  6/2012  Choi et al. .................... 370/311
2013/0003646 A1*  1/2013  Michel et al. ................ 370/315

FOREIGN PATENT DOCUMENTS

WO    WO 2009/098814 A1    8/2009
WO    WO 2010/013962 A2    2/2010

OTHER PUBLICATIONS

3GPP. MBSFN Subframe Configuration in the RN. 3GPP TSG RAN WG2 Meeting #69. R2-101097. Feb. 22-26, 2010.
3GPP. Comparing Alternatives of MBSFN Subframe Configurations for the Un Interface. 3GPP TSG RAN WG2 Meeting #69, R2-101164. Feb. 22-26, 2010.
3GPP. MBSFN Subframe Configuration. 3GPP TSG RAN WG2 Meeting #69. R2-101175. Feb. 22-26, 2010.
3GPP. Configuration of DL Un Subframes in RN and Donor eNB. 3GPP TSG RAN WG2 Meeting #69. R2-101204. Feb. 22-26, 2010.
3GPP. Relay Open Issues. 3GPP TSG RAN WG2 Meeting #69. R2-101416. Feb. 22-26, 2010.
3GPP. Consideration on Un link configuration. 3GPP TSG RAN WG2 Meeting #69. R2-101642. Feb. 22-26, 2010.

* cited by examiner

SYSTEM AND METHOD FOR SCHEDULING WIRELESS TRANSMISSIONS

PRIORITY CLAIM UNDER 35 U.S.C. §119(e)

This application claims the benefit of U.S. Provisional Application No. 61/320,039, filed Apr. 1, 2010, entitled "Opportunistic Reconfiguration of UL Resources for Relays," which is incorporated herein by reference in its entirety.

TECHNICAL FIELD OF THE INVENTION

This disclosure relates in general to wireless communication and, more particularly, to the operation of relay nodes used in wireless communication networks.

BACKGROUND OF THE INVENTION

Recent years have seen a significant and continuing increase in the demands placed on wireless communication networks, in terms of the amount of data communicated, geographic coverage, and the number of users served. Advanced communication technologies, such as 3GPP's Long-Term Evolution (LTE) and Worldwide Interoperability for Microwave Access (WiMax) have been developed in an attempt to address this increasing need. One solution that has been proposed for increasing coverage and throughput in future networks is the inclusion of relays capable of increasing the geographic coverage of radio access nodes. Because these relays interact with both wireless terminals and base stations, operation and management of these relays can be complicated, and efficient use of their capabilities can have a significant effect on overall system effectiveness.

The performance of a relay may be heavily dependent on the allocation of subframes between its "access link" (between the relay and a wireless terminal served by the relay) and a "backhaul link (between the relay and its donor base station). For example, if the backhaul link has poor radio quality relative to the access link, the backhaul link may become a bottleneck. In such situations, it may be beneficial to have more subframes configured for use on the backhaul link and less on the access link. On the other hand, if the backhaul link has good radio quality relative to the access link, then the access link may become a bottleneck. In such situations, it may be beneficial to have more subframes configured for use on the access link and less on the backhaul link.

Many in-hand relays use multicast-broadcast single frequency network (MBSFN) subframes for downlink transmission on their access link. Because the donor base station, or another controlling node (e.g., an Operations, Administration, and Maintenance (OAM) system), determines the MBSFN configuration for each of the relaying nodes served by the controlling node, the controlling node essentially determines the allocation between access link and the backhaul link for the managed relay. While the initial configuration can be re-configured by the controlling node, reconfiguring this allocation can take a significant amount of time, which may lead to inefficient resource utilization. For example, a change in allocation may require the donor base station to broadcast updated system information so that all wireless terminals are aware of the change in the configuration. As a result, it may be several seconds before such a change can be implemented in served wireless terminals. During this time, it may not be possible for the affected relay to use the new configuration or even, in some cases, all slots of the old configuration. This delay can make it difficult to assign more uplink slots to the access link when needed, e.g., when there is a wireless terminal with a bad connection to the relay.

Additionally, it might be beneficial for or required that the uplink and downlink configurations for the backhaul link match each other so that there is an uplink subframe a fixed number of subframes after a downlink subframe. This requirement ensures that a relay can send a hybrid automatic repeat request (HARQ) ACK/NACK report for received downlink packets. Therefore, even when it would be beneficial for uplink purposes to allocate more subframes to the relevant access link, the same settings for downlink may degrade downlink performance and the change may result in an overall performance deterioration.

Furthermore, it is often critical for a relay and its donor base station to have the same backhaul link configuration. Otherwise there is a risk that they will not be able to communicate with each other. As a result, signaling for such a reallocation of subframes may need to use a reliable signaling transport (e.g., Radio Resource Control (RRC) on top of Radio Link Control (RLC)/Media Access Control (MAC)). The reconfiguration of the relay and its donor base station may also need to be coordinated in time. Time synchronization can necessitate that further delays be added to the reconfiguration procedure to account for variations in the signaling delays (due to re-transmissions).

As a result, intelligently managing the allocation of transmission resources between a relay's access link and backhaul link can be critical to the relays performance. Additionally, the ability to adjust the allocation quickly and without significant complexity would be highly beneficial. Timely reallocation between the two links could significantly increase the performance of a relay and provide additional benefits.

SUMMARY OF THE INVENTION

In accordance with the present disclosure, certain disadvantages and problems associated with mobile communication have been substantially reduced or eliminated. In particular, certain apparatuses and methods for operating relays in communication networks are described.

In accordance with one embodiment of the present disclosure, a method of operating a relay node includes receiving information, at the relay node, information identifying a plurality of subframes. The subframes represent time periods during which a base station may grant the relay node permission to transmit to the base station on a first frequency. The method also involves selecting one of the identified subframes to be used for a transmission between the relay node and a wireless terminal on the first frequency and transmits to the wireless terminal a scheduling grant granting the wireless terminal permission to transmit information on the first frequency during the selected subframe.

In accordance with another embodiment of the present disclosure, a method of operating a base station in a telecommunication network includes transmitting information identifying a plurality of subframes from a base station to a relay node. The identified subframes represent time periods during which the base station may grant the relay node permission to transmit to the base station on a first frequency. The method also includes obtaining a ranking of the subframes and transmitting information indicating the ranking to the relay node.

Important technical advantages of certain embodiments of the present invention include optimizing use of transmission resources. Particular embodiments may also be capable of reallocating transmission resources with minimal delay and in a manner that can be tailored to the needs of the particular network. Other advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
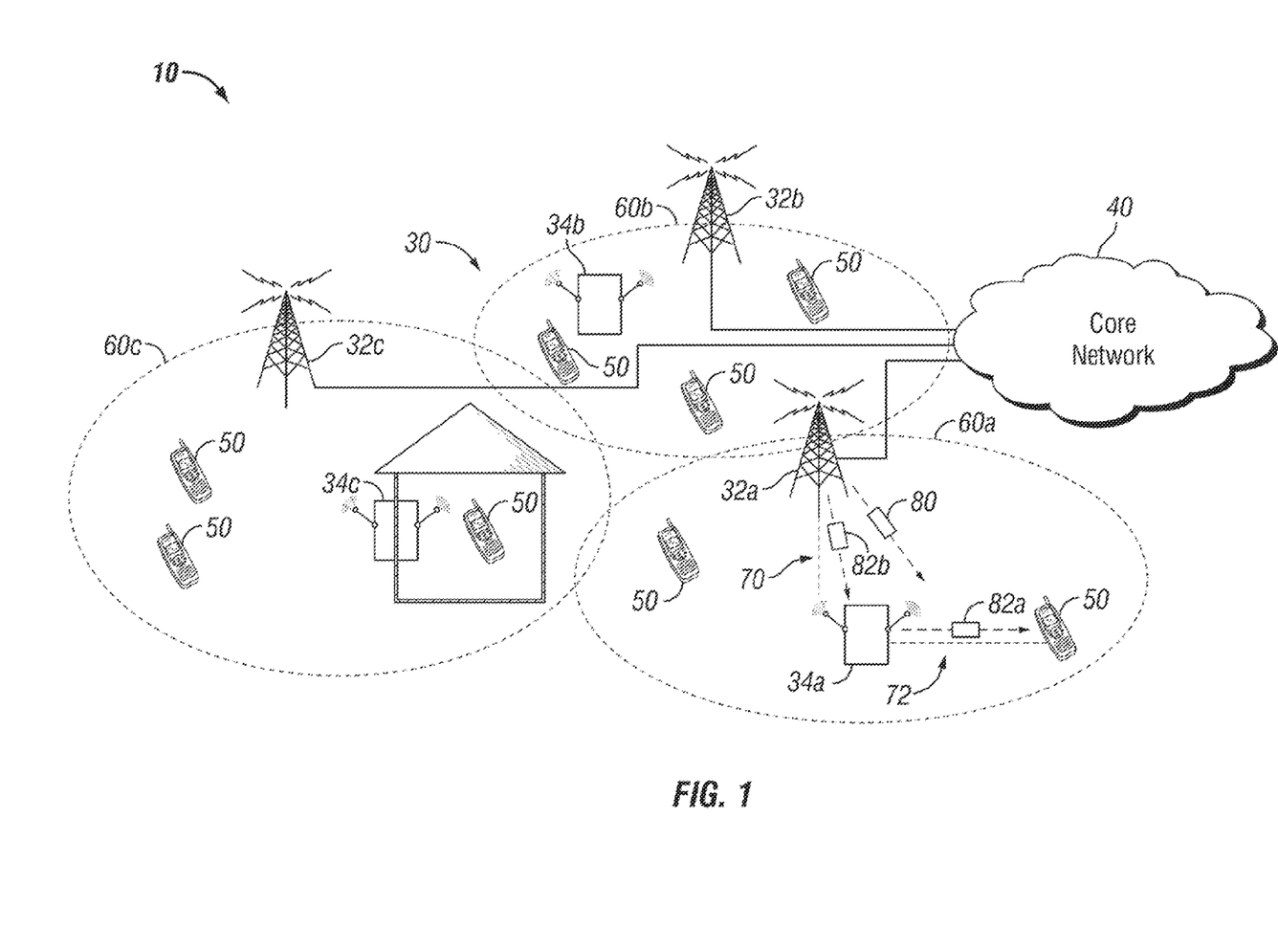
FIG. 1 illustrates a mobile communication system according to particular embodiments of the present disclosure.

FIG. 1 illustrates a mobile communication system 10 that provides service to a plurality of wireless terminals 20. Mobile communication system 10 includes an access network 30 responsible for interfacing with wireless terminals 50 and a core network 40 responsible for routing voice and/or data within mobile communication system 10. Additionally, access network 30 includes a plurality of base stations 32 capable of communicating wirelessly with wireless terminals 20 and a plurality of relay nodes 34 capable of relaying communication between wireless terminals 50 and base stations 32. As discussed further below, in particular embodiments, relay nodes 34 may be capable of increasing the throughput of mobile communication system 10 through selective and/or opportunistic use of the transmission resources available within mobile communication system 10.

In general, mobile communication system 10 provides mobile communication service to wireless terminals 20 operating within a geographic area associated with mobile communication system 10. Mobile communication system 10 may support communication of any suitable type and/or in accordance with any appropriate communication standards including, but not limited to, any Long Term Evolution (LTE), Worldwide Interoperability for Microwave Access (WiMAX), and Wideband Code Division Multiple Access (WCDMA) communication standards.

Access network 30 communicates wirelessly with wireless terminals 20 and serves as an interface between wireless terminals 20 and core network 40. Access network 30 may represent or include a radio access network and/or any elements responsible for providing a radio or air interface for core network 40. For example, in the illustrated embodiment, access network 30 includes base stations 32 and relay nodes 34. Access network 30 may also include base station controllers, access servers, gateways, and/or any additional components suitable for managing radio channels used by base stations 32 and relay nodes 34, authenticating users, controlling handoffs between base stations 32, and/or otherwise managing the interoperation of base stations 32 and interfacing base stations 32 with core network 40.

Base stations 32 communicate wirelessly with wireless terminals 20 to facilitate mobile communication for wireless terminals 20. Base stations 32 may include any appropriate elements to communicate with wireless terminals 20 and to interface wireless terminals 20 with core network 40. For example, depending on the communications standards supported by access network 30 and core network 40, each base station 32 may represent or include a base station, a Node B, an evolved Node B (eNode B), a radio base station (RBS), or any other suitable element capable of communicating with wireless terminals 20 wirelessly. The contents and operation of a particular embodiment of base station 32 are discussed in further detail below with respect to FIG. 4.

Relay nodes 34 forward information transmitted by wireless terminals 50 served by relay nodes 34 to base stations 32 and forward information transmitted by base stations 32 to these wireless terminals 50. Relay nodes 34 communicate wirelessly with wireless terminals 20 as well as with base stations 32. Relay nodes 34 may represent any appropriate combination of hardware and/or software suitable to forward information between wireless terminals 50 and base stations 32. In particular embodiments, relay nodes 34 may be configured to merely forward information received by relay nodes 34. In alternative embodiments, relay nodes 34 may represent repeaters capable of regenerating, amplifying, decoding and re-encoding, encapsulating, and/or otherwise processing received information before forwarding such information. More generally, however, relay nodes 34 may represent any suitable combination of hardware and/or software capable of forwarding information between wireless terminals 50 and base stations 32. In particular embodiments, relay nodes 34 may represent devices complying with Release 10 (or later releases) of the 3GPP LTE standard. The contents and operation of a particular embodiment of relay node 34 are discussed in greater detail below with respect to FIG. 2.

Relay nodes 34 are each associated with a particular base station 32, referred to as the "donor base station 32" for that particular relay node 34. Additionally, each relay node 34 controls a corresponding cell that appears to any wireless terminal 50 as a separate cell distinct from the cell of the corresponding donor base station 32. Each such cell has its own Physical Cell ID (as defined by LTE Release 8). Furthermore, in such embodiments, relay nodes 34 transmit their own synchronization channels and reference symbols. Wireless terminals 50 receive scheduling information and Hybrid Automatic Repeat reQuest ("HARQ") feedback directly from relay nodes 34 and send their control channels, including scheduling requests (SRs), channel quality indicators (CQIs), and acknowledgements (ACKs) to the relay node 34 serving those wireless terminals 50.

Core network 40 routes voice and/or data communicated by wireless terminals 20 from access network 30 to other wireless terminals 20 or to other communication devices coupled to core network 40 through landline connections or through other networks. Core network 40 may support any appropriate standards or techniques for routing such communications. For example, in embodiments of wireless terminals 20 that support LTE, core network 40 may represent an System Architecture Evolution (SAE) core network. Core network 40 may also be responsible for aggregating communication for longhaul transmission, authenticating users, manage user mobility, providing call control, billing, or other functionality associated with providing communication services to wireless terminals 20. In general, however, core network 40 may include any components suitable for routing and otherwise supporting voice and/or data communications for wireless terminals 20.

Wireless terminals 50 represent any devices capable of communicating information wirelessly with mobile communication system 10. Examples of wireless terminals 50 include traditional communication devices such as mobile phones, personal digital assistants ("PDAs"), laptop computers, and any other portable communication device suitable for use with communication system 10. For example, in particular embodiments, wireless terminals 50 each represent an LTE user equipment (UE). Additionally, in particular embodiments, wireless terminals 50 may also represent automated equipment or components equipped with components suitable to permit communication with mobile communication system 10, such as components in a home automation networked. For example, wireless terminals 50 may represent washing machines, stoves, digital video recorders (DVRs), or other home appliances capable of remote management over mobile communication system 10.

In operation, mobile communication system 10 provides telecommunication service to wireless terminals 50. As part of this service, access network 30 communicates wirelessly with wireless terminals 50. For example, in the illustrated embodiment, base stations 32 of access network 30 establish wireless connections with wireless terminals 50 for communication over radiofrequency (RF) channels. Meanwhile, core network 40 transports voice, data, multimedia, and/or other types of information between various components of access network 30 and between other elements of mobile communication system 10, such as wireline communication devices.

In order to increase coverage and/or throughput of access network 30, certain cells 60 of mobile communication system 10 also include one or more relay nodes 34. Relay nodes 34 retransmit signals received from wireless terminals 50 to appropriate elements of access network 30 (e.g., base stations 32 in the illustrated embodiment). Relay nodes 34 may also amplify repeated signals to further increase their signal strength when received at their intended destination. In particular embodiments, such as the one illustrated in FIG. 1, transmissions between relay nodes 34 and base stations 32 are communicated over a first radio link (shown in FIG. 1 as "backhaul link 70"). Backhaul link 70 may represent any suitable radio link between a relay node 34 and a particular base station 32, such as the radio link associated with a Un interface in an LTE system. Meanwhile, in particular embodiments, transmissions between wireless terminals 50 and relay nodes 34 are performed over another radio link (shown in FIG. 1 as "access link 72"). Access link 72 may represent any suitable radio link between a relay node 34 and a particular wireless terminal 50, such as the radio link associated with a Uu interface in an LTE system. In particular embodiments, access link 72 may be substantially similar or identical to the radio link wireless terminals 50 use to communicate directly with base stations 32 (i.e., without a relay node 34 in between).

In particular embodiments, relay nodes 34 operate as inband relays, and thus, retransmit received signals on the same frequency over which relay nodes 34 received such signals from the transmitting wireless terminals 50. To prevent intolerable levels of self-interference, inband relay nodes 34 are prevented from transmitting and receiving at the same time on the same frequencies. As explained above, the performance of relay nodes 34 may be heavily dependent on the allocation of subframes between access link 72 and backhaul link 70. As the quality of the various radio links and other factors change, the optimal allocation can also change. Therefore, the ability to quickly adjust the allocation between access link 72 and backhaul link 70 can greatly improve the performance of relay nodes 34. However, in conventional systems, this allocation may be set by the serving base station 32 on a semi-permanent basis and/or may be time-consuming to change.

As a result, in particular embodiments of mobile communication system 10, relay nodes 34 may selectively comply with scheduling grants scheduling transmissions by relay nodes 34 and/or may opportunistically schedule wireless terminals 50 during uplink subframes that were initially configured for use on a backhaul link 70. This may permit relay nodes 34 to utilize a more optimal distribution of transmission resources without experiencing the delay and overhead associated with reconfiguring the frame. The various embodiments of mobile communication system 10 may implement this behavior in several different ways.

As one example, in particular embodiments, a donor base station 32 (for purposes of illustration donor base station 32a) may configure a relay node 34 (assumed for this example to be relay node 34a) by providing information that indicates which of access link 72 and backhaul link 70 relay node 34a should give priority for uplink transmissions. If, for example, relay node 34a is configured to give priority to access link 72, relay node 34a will receive uplink transmissions on access link 72 instead of transmitting uplink transmissions on backhaul link 70 when the two coincide in time. For example, in particular embodiments, donor base station 32a may configure relay node 34a by transmitting a single-bit value to relay node 34a with a "0" meaning backhaul link 70 has priority for uplink transmissions and a "1" meaning access link 72 has priority for uplink transmissions, or vice versa In particular embodiments, the configured priority can depend, in part, on input from relay node 34a itself. Such embodiments may permit a more flexible tradeoff between access link 72 and backhaul link 70. Relay node 34a can provide input for this decision by signaling a preference for access link 72 or backhaul link 70. This preference can be a simple indicator, such as an indication that the relevant relay node 34 prefers more resources on its access link 72 or prefers more resources on its backhaul link 70.

Alternatively, relay node 34a may be configured (by signaling from base station 32a or in another suitable manner) to implement various decision rules or policies, giving different priority to backhaul link 70 and access link 72 depending on any appropriate factors, circumstances, or other considerations. Thus, in particular embodiments, base station 32a may configure relay node 34a to use different access link/backhaul link priorities depending on whether data or control signaling is being transmitted or depending on the current load or QoS configuration. For example, base station 32a may configure relay node 34a so that relay node 34a prioritizes transmitting any uplink control signaling or specific types of control signaling (such as HARQ ACK/NACK messages) on backhaul link 70 over receiving any type of uplink transmissions on access link 72; so that relay node 34a prioritizes transmitting uplink control signaling on backhaul link 70 over receiving uplink user data (and other non-control signaling) on access link 72, but not over receiving uplink control signaling on access link 72; so that relay node 34a prioritizes receiving any transmissions on access link 72 over transmitting uplink user data on backhaul link 70, but not over transmitting control signaling on backhaul link 70; or so that relay node 34a prioritizes receiving any transmissions on access link 72 over transmitting any type of uplink transmissions on backhaul link 70.

Similarly, relay node 34a may be configured so that backhaul link 70 has priority over access link 72 (or vice versa) based on a status of a transmission buffer in relay node 34 and/or an estimated status of a transmission buffer in one or more wireless terminals 50. If based on the status of multiple wireless terminals 50, the relevant wireless terminals 50 may represent all wireless terminals 50 served by relay node 34a or some combination of the wireless terminals 50 served by relay node 34a (e.g., all currently scheduled wireless terminals 50). For example, relay node 34a may be configured to calculate a first value indicating a status of its transmission buffer (e.g., a measure of the amount of data relay node 34a is currently waiting to transmit) and compare this first value to a second value indicating the status of the transmission buffers of the relevant wireless terminal or wireless terminals 50 (e.g., estimates of the total amount of data the relevant wireless terminal(s) 50 are currently waiting to transmit). Relay node 34 may then determine a backhaul link/access link priority based on whether the first value is greater than the second value. Alternatively, relay node 34 may be configured to set the priority based on whether the first value or second value exceeds some threshold.

As another example of how allocation between backhaul link 70 and access link 72 can be optimized, a donor base station 32 (such as base station 32a again) may, based on signaling from one or more relay nodes 34 served by that base station 32, concentrate its scheduling of transmissions on backhaul link 70 as much as possible (given current traffic load and other scheduling constraints) to a limited number of specific uplink subframes, thereby leaving more subframes available for use in opportunistic scheduling of uplink transmissions on the various access links 72 established by the relay nodes 34 served by that relay node 34. When a relay node 34 (such as relay node 34a) determines that an increase in the subframes available for access link 72 would be beneficial (based, for example, on a utilization factor of current access link subframes or on buffer status), relay node 34a signals to base station 32a that an increase in the subframes available for use on its access link, 72 would be beneficial. In particular embodiments, this signaling includes an indication of which subframes relay node 34a would prefer to use as the additional access link subframes (e.g., one or more subframes relay node 34a would prefer that base station 32a stopped using to schedule backhaul link transmissions from relay node 34a or one ore more subframes relay node 34a would prefer that base station 32a continued using for backhaul link transmissions).

In particular embodiments, the signaling from relay node 34a indicates only a preference and base station 32a is not required to change its scheduling if base station 32a decides against doing so. Therefore, in such embodiments, the signaling transport for this preference signaling does not need to be robust. If the preference signaling fails, relay node 34a can still continue to operate (although possibly without full efficiency) under the existing scheduling of base station 32a. This makes it possible to use fast less robust signaling such as MAC signaling (e.g., including the indication together with a buffer status report), instead of more reliable, but slower, signaling like RRC.

In response to signaling from relay node 34a, base station 32a will then make an attempt to concentrate its scheduling of relay node 34 to a limited number of the subframes available for uplink transmissions on backhaul link 70. For example, base station 32a may select a subset of subframes and choose to avoid scheduling relay node 34a during those subframes each frame or to schedule relay node 34a in those subframes only after all other subframes have been eliminated as options. This may reduce the number of subframes in which relay node 34a will experience conflicts between transmissions on access link 72 and backhaul link 70.

Furthermore, in embodiments in which relay node 34a signals a specific preference for the subframes to be used, base station 32a may further attempt to limit its scheduling of uplink transmissions on backhaul link 70 based on the indicated preferences of relay node 34a. In particular embodiments, base station 32a may also attempt to schedule downlink transmissions on backhaul link 70 based on the preference signaling transmitted by relay node 34a. For example, base station 32 may avoid scheduling downlink transmissions so that their corresponding ACK/NACK responses would need to be transmitted in uplink subframes that relay node 34a has requested base station 32a not to use for uplink transmissions on backhaul link 70. If base station 32a is able to comply with the request, relay node 34a can start scheduling on access link during subframes the donor base station 32 is now avoiding in scheduling backhaul link 70.

After requesting a change in the backhaul link/access link allocation, relay node 34a can monitor uplink scheduling on backhaul link 70 and adapt its uplink scheduling on access link 72 based on the backhaul link scheduling. Relay node 34a may also adjust its downlink scheduling on access link 72 to prevent any need for ACK/NACK transmissions from wireless terminals 50 when base station 32a has scheduled uplink transmissions for relay node 34a on backhaul link 70. If it detects that the preferred subframes are, despite the signaling, being scheduled by base station 32a for use on backhaul link 70, relay node 34a may try to signal another preference to base station 32a or limit or otherwise adjust its scheduling of uplink transmissions on access link 72. Similarly, if based on monitoring of scheduling on backhaul link 70, relay node 34 detects that no additional subframes (as opposed to just the preferred subframes) are being left for extra uplink backhaul link 70, relay node 34a limit or adjust its scheduling of uplink transmissions on access link 72.

Particular embodiments of mobile communication system 10 may be able to realize the preference signaling described above using existing signaling required in the relevant communication standards supported by mobile communication system 10. However, particular embodiments may require new signaling between relay nodes 34 and donor base stations 32. This signaling can be realized using any appropriate form of signaling. For example, in particular embodiments, the described signaling may be performed on the physical layer (e.g., on the Physical Dedicated Control CHannel in an LTE implementation) and can be sent as part of uplink grants or downlink assignments. Physical layer signaling can be extremely fast, but it can also consume a significant amount of transmission resources and may be less reliable. As an alternative, the described signaling may be performed on the MAC layer as part of a MAC control element, using existing MAC information elements (such as a buffer status report message) or new MAC information element added for this purpose. MAC control signaling is relatively fast by comparison to higher-level signaling (although slower than physical layer signaling), but provides better robustness and uses lower overhead than physical layer signaling. As another alternative, the described signaling can be performed on the network layer (e.g., using the RRC signaling in an LIE implementation), using existing network layer information elements or newly-added network layer elements. Network layer signaling can be very reliable but is also slower than physical or MAC layer signaling. The speed of network layer signaling can be a significant concern in networks where it is important to establish exactly when new settings relating to backhaul link/access link allocation will become effective.

As yet another example of how the allocation between backhaul link 70 and access link 72 can be optimized in particular embodiments, a relay node 34 (such as relay node 34a) may be configured to opportunistically schedule transmissions by wireless terminals 50 on access link 72 during subframes allocated by base station 32a for uplink transmission on backhaul link 70. In such embodiments, transmissions on access link 72 will be wasted if relay node 34a ends up being scheduled to perform an uplink transmission on backhaul link 70 during the relevant subframe. However, in certain embodiments that utilize this opportunistic scheduling, relay node 34 may be configured so that there is no need for additional signaling between relay node 34a and base station 32a to utilize this functionality.

Using opportunistic scheduling, relay node 34a can schedule a particular wireless terminal 50 (e.g., by transmitting a scheduling grant 82a) for uplink transmissions on access link 72 during a subframe allocated by base station 32a for uplink transmission on backhaul link 70 (such frames are, based on their initial scheduled use, referred to herein as "backhaul subframes"), hoping or expecting that there will be no granted uplink resource for relay node 34a on backhaul link 70 during the relevant subframe. If it turns out that relay node 34a is granted a resource or expected to transmit information (e.g., HARQ responses) during a backhaul subframe during which relay node 34a has opportunistically scheduled a wireless terminal 50 (e.g., if base station 32a transmits scheduling grant 82b to relay node 34a) to transmit on access link 72, relay node 34a will not decode the data transmitted by the scheduled wireless terminal 50. In such a case, the transmission from wireless terminal 50 will be wasted, but relay node 34 can re-schedule the wireless terminal 50 on a later subframe to repeat the transmission. However, if it turns out that relay node 34a does not need to transmit any data on backhaul link 70 during this backhaul subframe, relay node 34a will receive data from the scheduled wireless terminal 50 over access link 72 during the relevant subframe (assuming the scheduled wireless terminal 50 is successful in transmitting). Additionally, in particular embodiments, base station 32a can configure relay node 34a with suitable criteria, such as that described above with respect to prioritizing access link 72 and backhaul link 70, to decide when to opportunistically schedule on access link 72. For example, base station 32a can transmit configuration information to relay node 34a indicating conditions (e.g., a buffer status of wireless terminals 50 served by relay node 34a) under which relay node 34a should attempt to opportunistically schedule wireless terminals 50. Consequently, base station 32a can control, in part, the use of opportunistic scheduling by relay nodes 34 served by base station 32a.

Thus, particular embodiments of mobile communication system 10 provide solutions for optimizing the allocation of transmission resources available to relay nodes 34. Various embodiments may offer centralized management of the allocation using policies distributed to relay nodes 34, provide relay nodes 34 with means for adjusting (or requesting adjustments in) this allocation, and/or for opportunistic scheduling of access link traffic during unused backhaul subframes. This may lead to improved performance of relay nodes 34 and of mobile communication system 10 overall. As a result, particular embodiments of mobile communication system 10 provide several operational benefits. Specific embodiments however may provide some, none, or all of these benefits.

Figure 2:
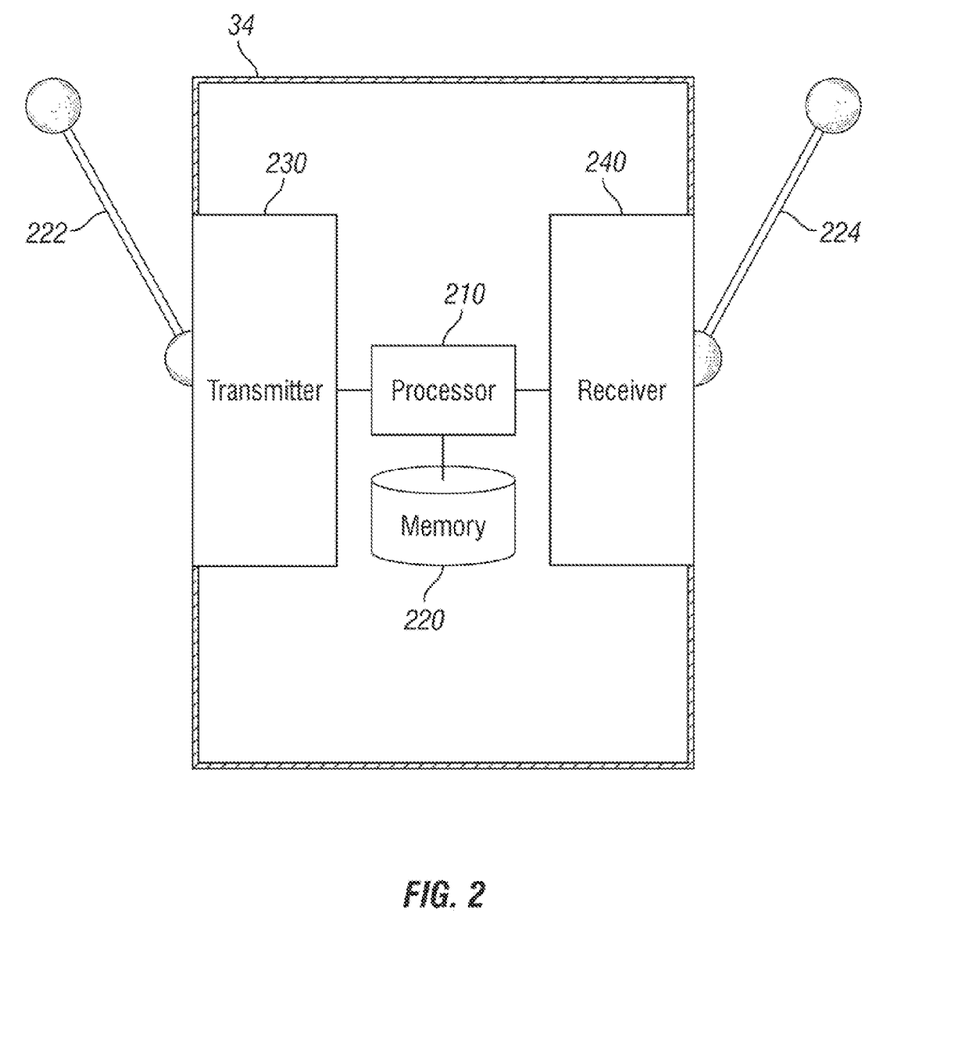
FIG. 2 is a block diagram illustrating in greater detail a relay node that may be utilized in the mobile communication system illustrated by FIG. 1.

FIG. 2 is a block diagram illustrating in greater detail contents of a particular embodiment of a relay node 34. As shown in FIG. 2, the illustrated embodiment of relay node 34 includes a processor 210, a memory 220, a first antenna 222, a second antenna 224, a transmitter 230, and a receiver 240.

Processor 210 may represent or include any form of processing component, including dedicated microprocessors, general-purpose computers, or other devices capable of processing electronic information. Examples of processor 210 include field-programmable gate arrays (FPGAs), programmable microprocessors, digital signal processors (DSPs), application-specific integrated circuits (ASICs), and any other suitable specific- or general-purpose processors. Although FIG. 2 illustrates, for the sake of simplicity, an embodiment of relay node 34 that includes a single processor 210, relay node 34 may include any number of processors 210 configured to interoperate in any appropriate manner.

Memory 220 stores processor instructions, configuration information, prioritization information, scheduling preference information, and/or any other data utilized by relay node 34 during operation. Memory 220 may comprise any collection and arrangement of volatile or non-volatile, local or remote devices suitable for storing data, such as random access memory (RAM), read only memory (ROM), magnetic storage, optical storage, or any other suitable type of data storage components. Although shown as a single element in FIG. 2 memory 220 may include one or more physical components local to or remote from relay node 34.

First antenna 222 and second antenna 224 represent any suitable conductors capable of receiving and transmitting wireless signals. Transmitter 230 transmits RF signals, including signals received from wireless terminals 50 that are being re-transmitted by relay node 34, over first antenna 22. Receiver 240 receives from antenna 24 certain RF signals transmitted by wireless terminals 50, relay node 34, and/or other sources. Although the example embodiment in FIG. 2 includes certain numbers of antennas, receivers, and transmitters, alternative embodiments of relay node 34 may include any suitable number of these components. For example, particular embodiments of relay node 34 may have more than two antennas. Similarly, certain embodiments may include an additional receiver associated with antenna 222 and an additional transmitter associated with antenna 224, or both transmitter 230 and receiver 240 may represent transceivers.

Figure 3A:
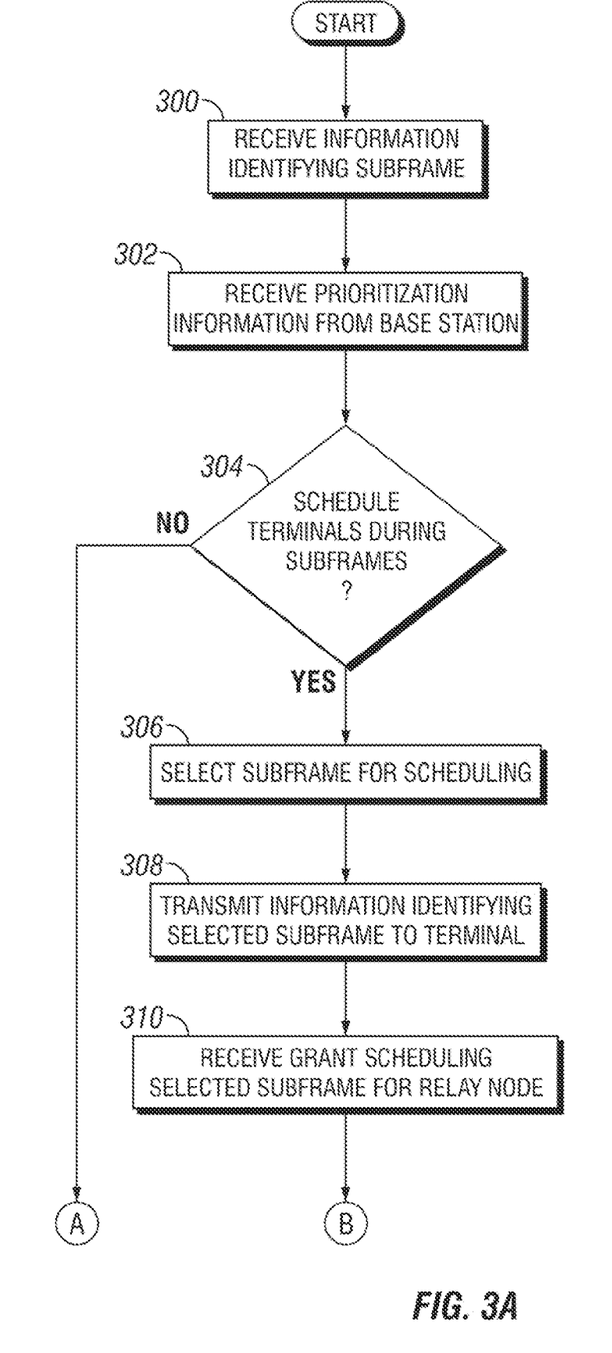
FIGS. 3A and 3B are a flow chart illustrating example operation of a particular embodiment of the relay node.
Figure 3B:
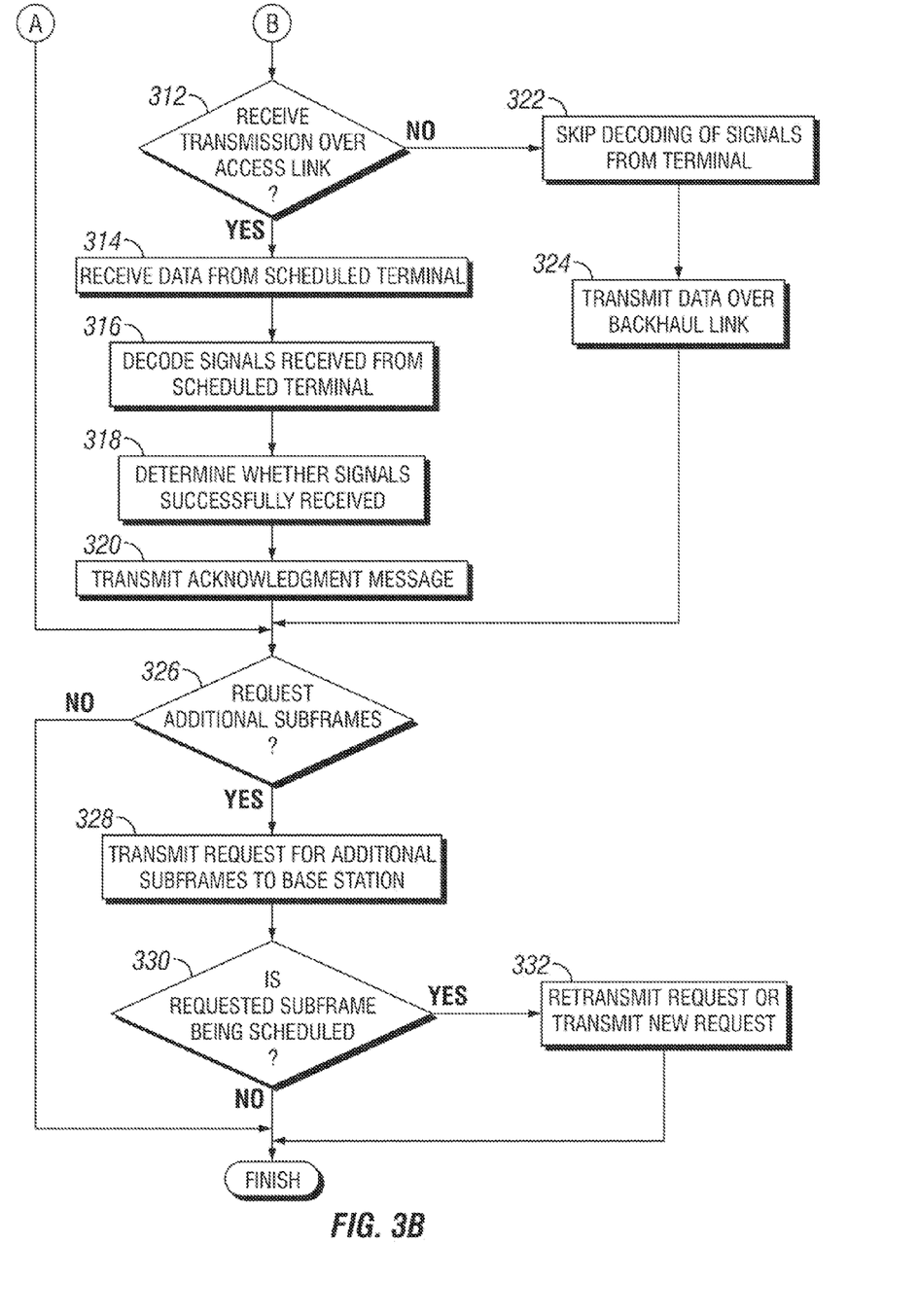

FIGS. 3A and 3B are a flow chart illustrating example operation for a particular embodiment of relay node 34. In particular, FIGS. 3A-3B illustrate example operation for an embodiment of relay node 34 that schedules wireless terminals 50 based on priority information obtained by relay node 34, from a donor base station 32 or another source. The steps illustrated in FIGS. 3A-3B may be combined, modified, or deleted where appropriate. Additional steps may also be added to the example operation. Furthermore, the described steps may be performed in any suitable order.

The method begins at step 300 with relay node 34 receiving, from base station 32, information identifying a plurality of backhaul transmission periods. The backhaul transmission periods represent or include time periods during which base station 32 may grant relay node 34 permission to transmit to the base station on a first frequency. In embodiments that implement LTE, a backhaul transmission period may represent a subframe which base station 32 has configured for use by relay node 34, and other devices served by base station 32, for uplink transmissions. Thus, in the example embodiment described by FIGS. 3A-3B, backhaul transmission periods each represent a subframe.

Relay node 34 may receive this information in any appropriate manner from base station 32 and as part of any suitable communication. In particular embodiments, relay node 34 receives this information as part of the system information broadcast by base station 32. For example, base station 32 may transmit a value identifying one of several predetermined subframe configurations for downlink and uplink transmissions on backhaul link 70.

Additionally, in particular embodiments, base station 32 (or another appropriate network node 400) may configure relay node 34 to perform opportunistic scheduling on backhaul link 70 in a particular manner. Thus, at step 302, relay node 34 receives prioritization information and/or scheduling preference information from base station 32 that indicates certain parameters to be used by relay node 34 in performing opportunistic scheduling on backhaul link 70. For example, in certain embodiments, base station 32 transmits prioritization information, to relay node 34 indicating a prioritization policy for relay node 34. This prioritization policy defines how relay node 34 should choose between receiving uplink data on access link 72 and transmitting uplink data over backhaul link 70. Examples of such policies may include, but are not limited to, preferring control information over user data and choosing to schedule opportunistically on access link 72 based on an amount of data waiting to be transmitted by relay node 34 and/or wireless terminal 50a. Alternatively or additionally, base station 32 may transmit scheduling preference information to relay node 34 that provides relay node 34 information on when to opportunistically schedule transmissions on access link 72. For example, this scheduling preference information may indicate a ranking of the subframes and relay node 34 may choose a subframe in which to schedule opportunistically based on this ranking, under the assumption that base station 32 will choose subframes in the opposite order for scheduling transmissions on backhaul link 70.

Based on any received prioritization information, scheduling preference information, and/or other configuration parameters, relay node 34 determines whether to schedule any wireless terminals 50 for transmission on access link 72 during subframes at step 304. As explained above, this decision may be based on prioritization polices configured in relay node 34, the amount or type (e.g., control or user data) of data waiting to be transmitted by relay node 34 or wireless terminals 50, a current state of relay node 34 or wireless terminals 50, and/or any other suitable parameter, factor, or consideration. If relay node 34 decides not to schedule any wireless terminals 50 opportunistically, operation advances to step 322.

If, however, relay node 34 decides to schedule one or more wireless terminals 50 to transmit over access link 72 during a subframe, relay node 34 selects a subframe to use for scheduling wireless terminals 50 opportunistically at step 306. In particular embodiments, base station 32 may transmit relay node 34 scheduling preference information that informs relay node 34 of an optimal subframe or optimal subframes for opportunistic scheduling. For example, base station 32 may signal an order for subframes to relay node 34. This order may indicate the order in which base station 32 will use backhaul subframes for scheduling uplink transmissions over backhaul link 70. Relay node 34 may then select a backhaul subframe for opportunistic scheduling based on the signaled order, thereby increasing the likelihood that base station 32 will not schedule transmissions on backhaul link 70 during a frame in which relay node 34 has scheduled a wireless terminal 50 to transmit over access link 72 on the same subframe.

At step 308, relay node 34 transmits information identifying the selected subframe to the scheduled wireless terminal 50. In particular embodiments, relay node 34 may transmit this information in the same manner as relay node 34 transmits other scheduling information to wireless terminals 50, such as by sending a scheduling grant to the scheduled wireless terminal 50.

After scheduling wireless terminals 50 opportunistically, relay node 34 may receive a scheduling grant granting relay node 34 permission to transmit to base station 32 over backhaul link 70 during one of the opportunistically-scheduled subframes. The example illustrated by FIGS. 3A-3B assumes that relay node 34 receives such a scheduling grant as shown at step 310. When relay node 34 receives a scheduling grant granting relay node 34 permission to transmit in a subframe in which relay node 34 has scheduled a wireless terminal 50, relay node 34 will receive a transmission from the scheduled wireless terminal 50 over access link 72 during the same time period as relay node 34 is scheduled to transmit over backhaul link 70. Thus, in particular embodiments, relay node 34 decides whether to receive a transmission from the opportunistically scheduled wireless terminal over access link 72 (in lieu of transmitting on backhaul link 70 as scheduled), as shown at step 312. In particular embodiments, relay node 34 may be configured to make this decision by always deferring to one or the other. For example, in particular embodiments, relay node 34 may always comply with scheduling grants it receives from base station 32, and may just ignore all transmissions from opportunistically scheduled wireless stations 50, requiring the relevant wireless stations 50 to re-send the same transmission at a later time. Alternatively, relay node 34 may determine based on a policy (e.g. a policy received as part of prioritization information sent by base station 32) whether to receive data from the opportunistically scheduled wireless terminal 50 or transmit its own scheduled data. Thus, as indicated above, relay node 34 may determine whether to receive data from wireless stations 50 or transmit data to base stations 32, based on the type of data to be transmitted by relay node 34 over backhaul link 70 and/or by wireless terminal 50 over access link 72, based on the amount of data to be transmitted by those components, and/or based on any other appropriate factor or consideration.

If relay node 34 decides to receive data from the scheduled wireless terminal 50, then at step 314 relay node 34 receives data from the scheduled wireless terminal 50. Relay node 34 may then decode the received signals or otherwise process the received signals in the same manner as relay node 34 would do for any scheduled data transmission from wireless terminals 50, as shown at step 316. Based on the results of this decoding, relay node 34 then determines whether the relevant transmission was successfully received (i.e., received without errors) at step 318. At step 320, relay node 34 then transmits an acknowledgement report (e.g., such as a report carrying HARQ ACK/NAK bits) indicating whether relay node 34 successfully received the information transmitted by the opportunistically scheduled wireless terminal 50 during the subframe. As part of receiving data from the scheduled wireless terminal 50, relay node 34 may refrain from transmitting information over backhaul link 70 on the relevant frequency as scheduled by the scheduling grant received from base station 32 and/or otherwise disregard the received scheduling grant.

If instead relay node 34 decides not to receive data from the scheduled wireless terminal 50, relay node 34 may simply ignore the data transmitted by the scheduled wireless terminal 50, discard any data received from the scheduled wireless terminal 50, and/or skip processing normally performed on signals received from scheduled wireless terminals 50. As an example, at step 322 in FIGS. 3A-3B, relay node 34 elects not to decode signals received from the scheduled wireless terminal 50. Relay node 34 also transmits its scheduled data to base station 32 over backhaul link 70 at step 324.

In particular embodiments, relay node 34 may be capable of requesting that additional time periods be used for transmissions on access link 72. An example of this process is shown at steps 326-332 in FIGS. 3A-3B. At step 326, relay node 34 decides whether to request additional subframes from base station 32 for use in scheduling transmissions on access link 72. Relay node 34 may make this determination based on a number of scheduling requests received from wireless terminals 50, an amount of data scheduled to be transmitted by wireless terminals 50, or any other suitable consideration.

If relay node 34 decides to request additional subframes, relay node 34 transmits a request for additional transmission periods to base station 32 at step 328. In particular embodiments, the request may also specify one or more requested subframes that relay node 34 would like to use for scheduling wireless terminals 50 on access link 72. If base station 32 can grant the request, base station 32 may subsequently schedule relay node 34 on other subframes and avoid scheduling relay node 34 for uplink transmissions during the requested subframe(s). Relay node 34 may then monitor the scheduling by base station 32 to see if base station 32 has scheduled uplink transmissions on backhaul link 70 during the requested period(s), as shown at step 330. If so, relay node 34 may attempt to retransmit the request or transmit a request for other period(s) at step 332.

If relay node 34 does not detect that base station 32 is still scheduling backhaul transmissions during the requested transmission period(s), relay node 34 may then select the requested transmission period(s) for use when making subsequent attempts to opportunistically schedule wireless terminals 50. If relay node 34 determines that base station 32 is still scheduling during the requested transmission periods, relay node 34 may select subframes for subsequent opportunistic scheduling attempts independent of the requested transmission period(s). Operation of relay node 34 may then continue indefinitely or terminate with respect to scheduling as shown in FIGS. 3A-3B.

Figure 4:
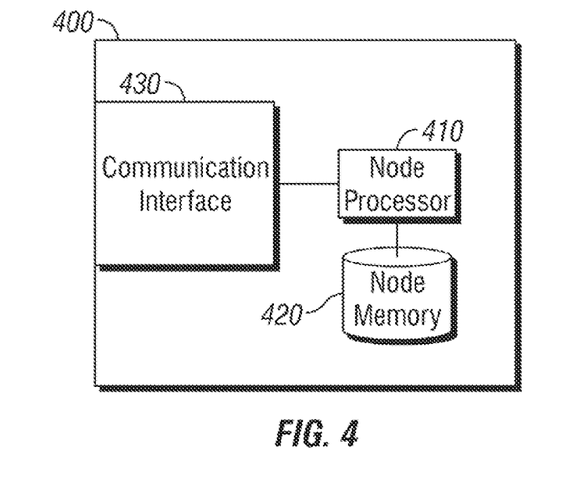
FIG. 4 is a block diagram illustrating in greater detail a network node that may be utilized in the mobile communication system illustrated by FIG. 1.

FIG. 4 is a block diagram illustrating in greater detail contents of a particular embodiment of a network node 400 that may be used to configure relay node 34 in particular embodiments of mobile communication system 10. Network node 400 may be any appropriate element of mobile communication system 10. In particular embodiments, such as the one illustrated in FIG. 1, network node 400 represents a base station 32, such as an enhanced Node B (eNodeB). As shown in FIG. 4, the illustrated embodiment of network node 400 includes a node processor 410, a node memory 420, and a communication interface 430.

Node processor 410 may represent or include any form of processing component, including dedicated microprocessors, general-purpose computers, or other devices capable of processing electronic information. Examples of processor node 410 include field-programmable gate arrays (FPGAs), programmable microprocessors, digital signal processors (DSPs), application-specific integrated circuits (ASICs), and any other suitable specific- or general-purpose processors. Although FIG. 4 illustrates, for the sake of simplicity, an embodiment of network node 400 that includes a single node processor 410, network node 400 may include any number of node processors 410 configured to interoperate in any appropriate manner.

Node memory 420 stores processor instructions, frame configurations, subframe preferences for relay nodes 34, and/or any other data utilized by network node 400 during operation. Memory 420 may comprise any collection and arrangement of volatile or non-volatile, local or remote devices suitable for storing data, such as random access memory (RAM), read only memory (ROM), magnetic storage, optical storage, or any other suitable type of data storage components. Although shown as a single element in FIG. 4, memory 420 may include one or more physical components local to or remote from network node 400.

Communication interface 430 comprises electronic circuitry and other components suitable to permit network node 400 to communicate with relay nodes 34 directly or indirectly. For example, in embodiments in which network node 400 represents a node separate from the radio elements of access network 30 (e.g., a radio network controller) communication interface 430 may represent circuitry capable of communicating over a wireline connection between network node 400 and the radio elements of access network 30 (e.g., circuitry capable of establishing and utilizing Iub and Iur interfaces for communication with base stations 32 and other radio network controllers 34, respectively). In such embodiments, network node 400 may use communication interface 430 to transmit information for relay node 34 to radio elements (such as base stations 32) that are capable of communicating wirelessly with relay nodes 34. As an alternative example, in embodiments in which network node 400 itself represents a radio element (such as an enhanced Node B (eNodeB) in a Long Term Evolution (LTE) system), communication interface 430 may instead include circuitry and components capable of communicating with relay node 34 over a wireless connection, such as an antenna and radiofrequency transmitter and receiver.

Figure 5:
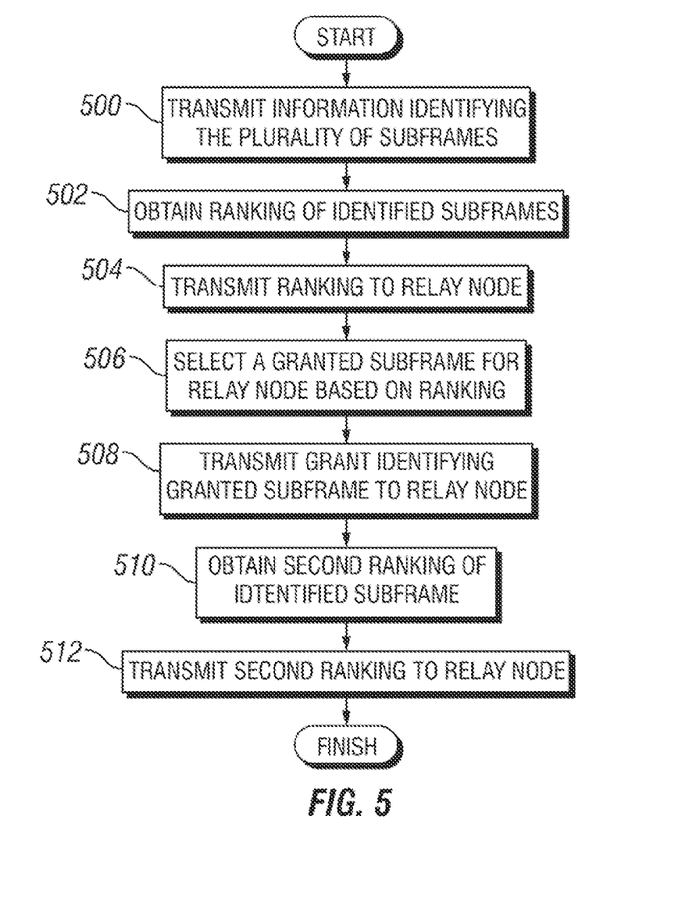
FIG. 5 is a flowchart illustrating example operation of a particular embodiment of the network node.

FIG. 5 is a flow chart illustrating example operation for a particular embodiment of network node 400 in responding to requests from relay nodes 34. In particular, FIG. 5 illustrates operation for an examples in which a network node 400 (e.g., a base station 32) responding to requests for additional transmission resources from relay node 34. The steps illustrated in FIG. 5 may be combined, modified, or deleted where appropriate. Additional steps may also be added to the example operation. Furthermore, the described steps may be performed in any suitable order.

Operation of base station 32 begins in this example at step 500 with network node 400 transmitting information identifying a plurality of backhaul transmission periods to relay node 34. As noted above, the backhaul transmission periods represent or include time periods (such as particular subframes of a radio frame) during which base station 32 may grant relay node 34 permission to transmit to the base station on a first frequency. Although backhaul transmission periods may represent any suitable periods of time, FIG. 5 illustrates an example embodiment in which backhaul transmission periods each represent a subframe.

Network node 400 may transmit this information in any appropriate manner. In particular embodiments, network node 400 transmits this information as part of system information 80 broadcast by network node 400 or a radio element controlled by network node 400. For example, network node 400 may transmit a value identifying one of several predetermined subframe configurations for downlink and uplink transmissions on backhaul link 70 in the broadcast system information.

At step 502, network node 400 obtains a ranking of the subframes. This ranking represents a ranking of the order to be used by network node 400 in choosing subframes for use in scheduling relay nodes 34 served by network node 400 or in scheduling a particular relay node 34. Network node 400 may obtain this ranking in any suitable manner. As one example, network node 400 be configured with this ranking before operation. As another example, network node 400 may generate this ranking by receiving information from relay nodes 34 indicating preferred transmission periods for access link transmissions. In particular embodiments, network node 400 may also transmit the ranking to relay node 34 as shown at step 504. Alternatively, relay node 34 may be configured with the ranking before beginning operation.

After obtaining the ranking, network node 400 uses this information to assign transmission periods to relay node 34 when relay node 34 is granted permission to transmit on backhaul link 70. In the example illustrated by FIG. 5, network node 400 is assumed to decide that relay node 34 should be granted use of a subframe during the current frame. As a result, at step 506, network node 400 selects a granted period for the relay node based on the ranking. Network node 400 then transmits a scheduling grant identifying the granted period to relay node 34 at step 508.

Relay node 34 may then grant wireless terminals 50 permission to transmit on access link 72. If relay node 34 is capable of opportunistic scheduling, network node 400 may transmit the ranking obtained by network node 400 to relay node 34 or relay node 34 may otherwise be configured with this information. Relay node 34 may then select subframes for opportunistic use by wireless terminals 50 based on this ranking. By selecting transmission periods using the reverse of the ranking used by network node 400, relay node 34 can reduce the likelihood that relay node 34 will opportunistically schedule wireless terminals 50 during the same subframes for which relay node 34 ultimately receives a scheduling grant.

In particular embodiments, relay nodes 34 may also be capable of requesting additional transmission resources for use on their respective access links 72. Thus, in the described example, base station network node 400 receives, at step 510, a request from relay node 34 for additional transmission resources to use on its access link 72. Network node 400 can respond to these requests in various ways depending on its configuration. In particular embodiments, network node 400 can attempt to concentrate its scheduling grants into a smaller number of different subframes. Additionally, in particular embodiments, network node 400 may respond to the request for additional transmission resources by obtaining a second ranking of the subframes, as shown at step 512. For example, the request for additional transmission resources may identify specific transmission period(s) that relay node 34 would prefer that network node 400 use or not use when granting relay node 34 permission to transmit on backhaul link 70. Network node 400 then generate a second ranking raising or lowering the specified transmission period(s) as appropriate to comply with the request from relay node 34.

After obtaining the second ranking, network node 400 may transmit the second ranking to relay node 34 at step 514. Relay node 34 may then use the second ranking to perform opportunistic scheduling. Operation of network node 400 may then continue indefinitely or terminate as shown in FIG. 5.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method of operating a relay node in a telecommunication network, comprising:
receiving, at a relay node, information identifying a plurality of subframes during which a base station may grant the relay node permission to transmit to the base station on a first frequency;
selecting one of the identified subframes to be used for a transmission between the relay node and a wireless terminal on the first frequency; and
transmitting to the wireless terminal a scheduling grant granting the wireless terminal permission to transmit on the first frequency during the selected subframe.

2. The method of claim 1, further comprising:
receiving from the base station a scheduling grant granting the relay node permission to transmit to the base station on the first frequency during the selected subframe;
deciding whether to receive a transmission from the wireless terminal during the selected subframe; and
in response to deciding to receive a transmission from the wireless terminal during the selected subframe:
receiving information transmitted by the wireless terminal on the first frequency during the selected subframe;
decoding the information transmitted by the wireless terminal;
determining whether the information transmitted by the wireless terminal was successfully received; and
transmitting an acknowledgement report to the wireless terminal indicating whether the information transmitted by the wireless terminal was successfully received.

3. The method of claim 2, further comprising, in response to deciding to receive a transmission from the wireless terminal during the selected subframe, refraining from transmitting information to the base station on the first frequency in the selected subframe as scheduled by the received scheduling grant.

4. The method of claim 2, wherein deciding whether to receive the transmission comprises deciding whether to receive the transmission from the wireless terminal based, at least in part, on whether the wireless terminal is scheduled to transmit control signaling on the first frequency during the granted subframe or on whether the relay node is scheduled to transmit control signaling to the base station on the first frequency during the granted subframe.

5. The method of claim 2, wherein deciding whether to receive the transmission comprises deciding whether to receive the transmission from the wireless terminal based, at least in part, on a status of one or more buffers in the relay node or on information received by the relay node indicating a status of one or more buffers in the wireless terminal.

6. The method of claim 2, further comprising receiving, at the relay node, prioritization information indicating a policy for prioritizing transmissions on a backhaul link relative to transmissions on an access link, and wherein deciding whether to receive a transmission from the wireless terminal during the selected subframe comprises deciding whether to receive a transmission from the wireless terminal during the selected subframe based on the policy.

7. The method of claim 1, wherein selecting the subframe comprises:
   receiving, at the relay node, prioritization information indicating a policy for prioritizing transmissions on a backhaul link relative to transmissions on an access link; and
   deciding whether to schedule a wireless terminal for transmission during a particular subframe based on the policy.

8. The method of claim 7, wherein deciding whether to schedule a wireless terminal based on the policy comprises determining whether to schedule a wireless terminal based on at least one of the following:
   an amount of data waiting to be transmitted by one of the relay node and the wireless terminal; and
   a type of information waiting to be transmitted by one of the relay node and the wireless terminal.

9. The method of claim 1, wherein selecting the subframe comprises:
   receiving scheduling preference information from the base station; and
   selecting a subframe based, at least in part, on the received scheduling preference information.

10. The method of claim 9, wherein:
   receiving scheduling preference information comprises receiving information indicating an order associated with the plurality of subframes; and
   selecting the subframe comprises selecting a subframe based, at least in part, on the indicated order.

11. The method of claim 9, wherein the scheduling preference information comprises a first set of scheduling preference information and the selected subframe comprises a first selected subframe, and further comprising:
   transmitting a request for additional transmission resources to the base station;
   receiving a second set of scheduling preference information from the base station in response to the request; and
   selecting a second subframe based on the second set of scheduling preference information.

12. The method of claim 1, further comprising:
   transmitting a request for additional transmission resources to the base station, wherein the request identifies one or more requested subframes; and
   selecting a second subframe based on the requested subframes.

13. The method of claim 12, wherein transmitting the request for additional transmission resources comprises transmitting the request using medium access control ("MAC") layer signaling.

14. The method of claim 12, wherein transmitting the request for additional transmission resources comprises transmitting the request using radio resource control ("RRC") layer signaling.

15. The method of claim 12, wherein transmitting the request for additional transmission resources comprises transmitting the request using physical layer signaling.

16. The method of claim 12, wherein transmitting the request for additional transmission resources comprises:
   deciding to request additional transmission resources based on a number of scheduling requests received by the relay node from one or more wireless terminals; and
   in response to deciding to request additional transmission resources, transmitting a request for additional transmission resources.

17. The method of claim 12, wherein transmitting the request for additional transmission resources comprises:
   deciding to request additional transmission resources based on a status of one or more buffers associated with one or more wireless terminals; and
   in response to deciding to request additional transmission resources, transmitting the request for additional transmission resources.

18. A method of operating a base station in a telecommunication network, comprising:
   transmitting information identifying a plurality of subframes from a base station to a relay node, wherein the identified subframes comprise subframes during which the base station may grant the relay node permission to transmit to the base station on a first frequency;
   obtaining a ranking of the subframes; and
   transmitting information indicating the ranking to the relay node.

19. The method of claim 18, further comprising:
   selecting a granted subframe for the relay node based on the ranking, wherein the granted subframe comprises a subframe during which the relay node is scheduled to transmit information to the base station on a first frequency; and
   transmitting a scheduling grant identifying the granted subframe to the relay node.

20. The method of claim 19, further comprising:
   receiving a request for additional transmission resources from the relay node;
   obtaining a second ranking of the subframes in response to the request;
   selecting a second granted subframe for the relay node based on the second ranking; and
   transmitting a second scheduling grant identifying the second granted subframe to the relay node.

21. The method of claim 20, wherein:
   receiving the request for additional transmission resources comprises receiving a request that identifies one or more requested subframe; and
   obtaining a second ranking of the subframes comprises modifying the ranking with respect to the requested subframes.

22. A relay node for supporting wireless communication, comprising:
   a transmitter operable to transmit information wirelessly on a first frequency;
   a receiver operable to receive information transmitted wirelessly on the first frequency; and
   a processor operable to:
      receive information identifying a plurality of subframes during which a base station may grant the relay node permission to transmit to the base station on a first frequency;
      select one of the identified subframes to be used for a transmission between the relay node and a wireless terminal on the first frequency; and
      transmit to the wireless terminal a scheduling grant granting the wireless terminal permission to transmit on the first frequency during the selected subframe.

23. The relay node of claim 22, wherein the processor is further operable to:
   receive a scheduling grant granting the relay node permission to transmit to the base station on the first frequency during the selected subframe;

decide whether to receive a transmission from the wireless terminal during the selected subframe; and in response to deciding to receive a transmission from the wireless terminal during the selected subframe:
receiving information transmitted by the wireless terminal on the first frequency during the selected subframe;
decoding the information transmitted by the wireless terminal;
determining whether the information transmitted by the wireless terminal was successfully received; and
transmitting an acknowledgement report to the wireless terminal indicating whether the information transmitted by the wireless terminal was successfully received.

24. The relay node of claim 23, wherein the processor is further operable in response to deciding to receive a transmission from the wireless terminal during the selected subframe, to refrain from transmitting information to the base station on the first frequency in the selected subframe as scheduled by the received scheduling grant.

25. The relay node of claim 23, wherein the processor is operable to decide whether to receive the transmission by deciding whether to receive the transmission from the wireless terminal based, at least in part, on whether the wireless terminal is scheduled to transmit control signaling on the first frequency during the granted subframe or on whether the relay node is scheduled to transmit control signaling to the base station on the first frequency during the granted subframe.

26. The relay node of claim 23, wherein the processor is operable to decide whether to receive the transmission by deciding whether to receive the transmission from the wireless terminal based, at least in part, on a status of one or more buffers in the relay node or on information received by the relay node indicating a status of a buffer in the wireless terminal.

27. The relay node of claim 23, wherein the processor is further operable to receive prioritization information indicating a policy for prioritizing transmissions on a backhaul link relative to transmissions on an access link, and wherein deciding whether to receive a transmission from the wireless terminal during the selected subframe comprises deciding whether to receive a transmission from the wireless terminal during the selected subframe based on the policy.

28. The relay node of claim 22, wherein the processor is operable to select the subframe by:
receiving prioritization information indicating a policy for prioritizing transmissions on a backhaul link relative to transmissions on an access link; and
deciding whether to schedule a wireless terminal for transmission during a particular subframe based on the policy.

29. The relay node of 28, wherein the processor is operable to decide whether to schedule a wireless terminal based on the policy by determining whether to schedule a wireless terminal based on at least one of the following:
an amount of data waiting to be transmitted by one of the relay node and the wireless terminal; and
a type of information waiting to be transmitted by one of the relay node and the wireless terminal.

30. The relay node of claim 22, wherein the processor is operable to select the subframe by:
receiving scheduling preference information from the base station; and
selecting one or more subframes based, at least in part, on the received scheduling preference information.

31. The relay node of claim 30, wherein the processor is operable to:
receive scheduling preference information by receiving information indicating an order associated with the plurality of subframes; and
select one or more subframes by selecting a subframe based, at least in part, on the indicated order.

32. The relay node of claim 30, wherein the scheduling preference information comprises a first set of scheduling preference information and the selected subframe comprises a first selected subframe, and wherein the processor is further operable to:
transmit a request for additional transmission resources to the base station;
receive a second set of scheduling preference information from the base station in response to the request; and
select a second subframe based on the second set of scheduling preference information.

33. The relay node of claim 22, wherein the processor is further operable to:
transmit a request for additional transmission resources to the base station, wherein the request identifies a requested subframe; and
select a second subframe based on the requested subframe.

34. The relay node of claim 33, wherein the processor is operable to transmit the request for additional transmission resources by transmitting the request using medium access control ("MAC") layer signaling.

35. The relay node of claim 33, wherein the processor is operable to transmit the request for additional transmission resources by transmitting the request using radio resource control ("RRC") layer signaling.

36. The relay node of claim 33, wherein the processor is operable to transmit the request for additional transmission resources by transmitting the request using physical layer signaling.

37. The relay node of claim 33, wherein the processor is operable to transmit the request for additional transmission resources by:
deciding to request additional transmission resources based on a number of scheduling requests received by the relay node from one or more wireless terminals; and
in response to deciding to request additional transmission resources, transmitting a request for additional transmission resources.

38. The relay node of claim 33, wherein the processor is operable to transmit the request for additional transmission resources by:
deciding to request additional transmission resources based on a status of a buffer associated with one or more wireless terminals; and
in response to deciding to request additional transmission resources, transmitting the request for additional transmission resources.

39. A base station for supporting wireless communication, comprising:
a transmitter operable to transmit information wirelessly on a first frequency;
a receiver operable to receive information transmitted wirelessly on the first frequency; and
a processor operable to:
transmit information to a relay node identifying a plurality of subframes during which the base station may grant the relay node permission to transmit to the base station on a first frequency;
obtain a ranking of the subframes; and transmit information indicating the ranking to the relay node.

40. The base station of claim 39, wherein the processor is further operable to:
- select a granted subframe for the relay node based on the ranking, wherein the granted subframe comprises a subframe during which the relay node is scheduled to transmit information to the base station on a first frequency; and
- transmit a scheduling grant identifying the granted subframe to the relay node.

41. The base station of claim 40, wherein the processor is further operable to:
- receive a request for additional transmission resources from the relay node;
- obtain a second ranking of the subframes in response to the request;
- select a second granted subframe for the relay node based on the second ranking; and
- transmit a second scheduling grant identifying the second granted subframe to the relay node.

42. The base station of claim 41, wherein the processor is operable to:
- receive the request for additional transmission resources comprises receiving a request that identifies a requested period; and
- obtain a second ranking of the subframes comprises modifying the ranking with respect to the requested period.

\* \* \* \* \*